US011302175B2

(12) United States Patent
Chang et al.

(10) Patent No.: US 11,302,175 B2
(45) Date of Patent: Apr. 12, 2022

(54) SYSTEMS AND METHODS FOR NETWORK-IMPLEMENTED DISTANCING ENFORCEMENT

(71) Applicant: Verizon Patent and Licensing Inc., Basking Ridge, NJ (US)

(72) Inventors: Patricia R. Chang, San Ramon, CA (US); Jin Yang, Orinda, CA (US); Arda Aksu, Martinez, CA (US); Lalit R. Kotecha, San Ramon, CA (US); Donna L. Polehn, Mercer Island, WA (US); Vishwanath Ramamurthi, San Ramon, CA (US); David Chiang, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/939,953

(22) Filed: Jul. 27, 2020

(65) Prior Publication Data
US 2022/0028246 A1 Jan. 27, 2022

(51) Int. Cl.
*G08B 21/24* (2006.01)
*H04W 4/021* (2018.01)
*G08B 31/00* (2006.01)
*H04W 4/029* (2018.01)
*H04W 4/024* (2018.01)

(52) U.S. Cl.
CPC ........... *G08B 21/245* (2013.01); *G08B 31/00* (2013.01); *H04W 4/021* (2013.01); *H04W 4/024* (2018.02); *H04W 4/029* (2018.02)

(58) Field of Classification Search
None
See application file for complete search history.

(56) References Cited

U.S. PATENT DOCUMENTS

2019/0204108 A1\* 7/2019 Benincasa .......... G01C 21/3658
2020/0236120 A1\* 7/2020 Monteil .............. H04L 41/0806

\* cited by examiner

*Primary Examiner* — Adolf Dsouza

(57) ABSTRACT

A system described herein may provide a technique for the network-implemented detection of locations that exhibit excessive density of individuals, and/or for the detection of individuals who do not maintain a minimum level of distance between each other. Location information of one or more User Equipment ("UEs") may be monitored and compared to policy information to determine that the locations exhibit at least a threshold level of population density. Further, remedial measures may be taken when such situations are detected, such as alerting devices that are located within, or are heading towards, such locations.

20 Claims, 15 Drawing Sheets

US 11,302,175 B2

SYSTEMS AND METHODS FOR NETWORK-IMPLEMENTED DISTANCING ENFORCEMENT

BACKGROUND

Wireless networks may include Multi-Access/Mobile Edge Computing ("MEC") devices, referred to sometimes herein simply as ("MECs"), that may perform computations or computing at the "edges" of the wireless network, without requiring network traffic to traverse the core of the wireless network. Devices such as wireless telephones, Internet of Things ("IoT") devices, or the like may be able to communicate with MECs using low latency communications, which may enable the robust computing power of MECs to be leveraged for use by such wireless telephones, IoT devices, etc.

DETAILED DESCRIPTION OF THE PREFERRED EMBODIMENTS

The following detailed description refers to the accompanying drawings. The same reference numbers in different drawings may identify the same or similar elements.

Embodiments described herein provide for the network-implemented detection of locations that exhibit excessive density of individuals, and/or for the detection of individuals who do not maintain a minimum level of distance between each other. Further, as described herein, some embodiments provide for the performance of remedial measures when such situations are detected.

Figure 1:
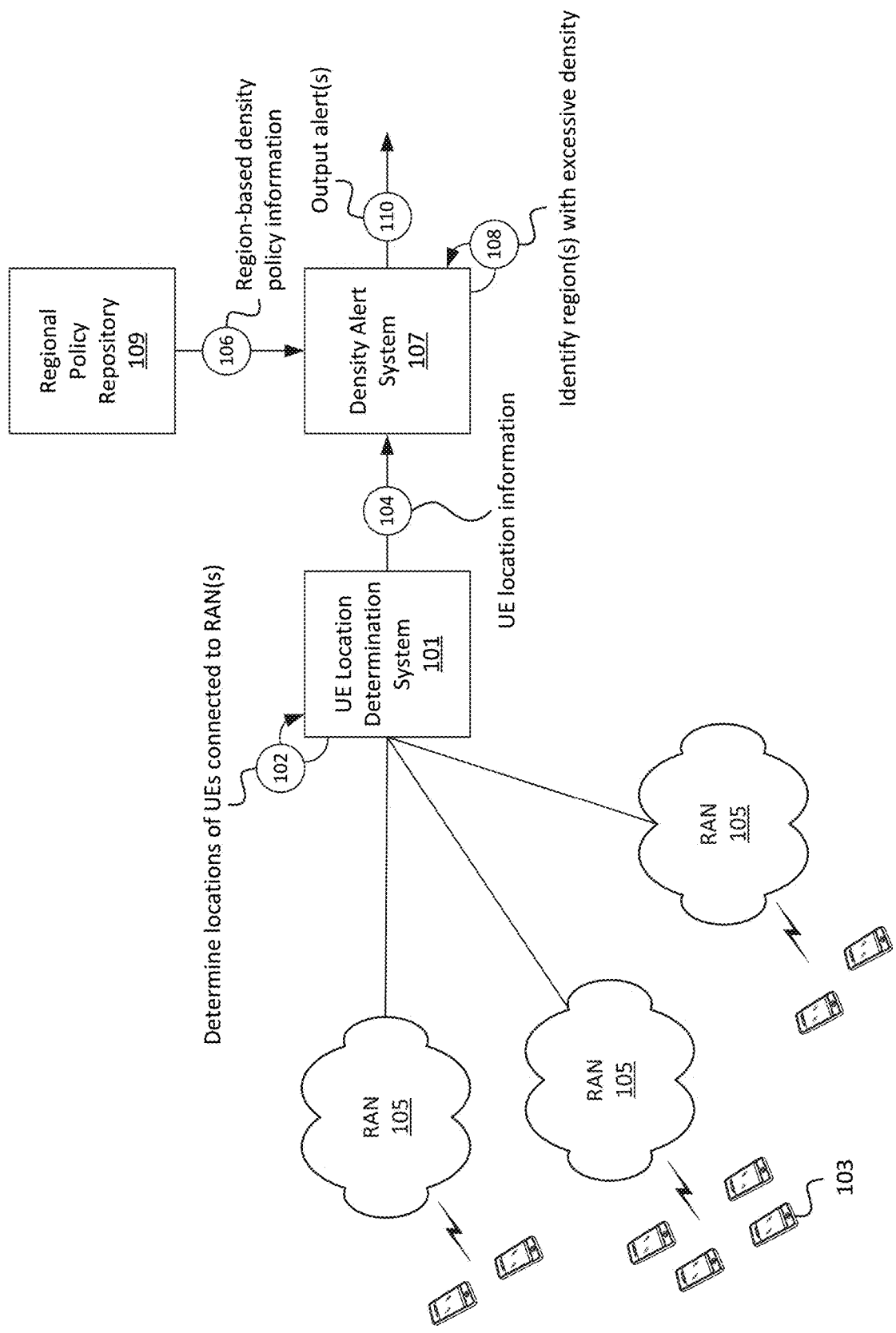
FIG. 1 illustrates an example of determining that a particular geographic location is densely populated based on User Equipment ("UE") location information.

For example, as shown in FIG. 1, UE Location Determination System 101 may determine (at 102) location information of one or more UEs 103 connected to one or more RANs 105. For example, UEs 103 may be mobile telephones, tablet computers, and/or other types of devices. In some embodiments, UE Location Determination System 101 may receive location information for different types of devices (e.g., mobile telephones, desktop computers, Internet of Things ("IoT") devices, Machine-to-Machine ("M2M") devices, and/or other types of devices), and may filter out certain types of devices (e.g., IoT devices, M2M devices, desktop computers, or the like), and/or may evaluate only locations of other types of devices (e.g., mobile telephones, tablet computers, or the like). In some embodiments, UE Location Determination System 101 may receive location information, associated with UEs 103, directly from UEs 103 (e.g., by way of messages from UEs 103 to UE Location Determination System 101 via an Application Programming Interface ("API") or some other suitable communication pathway), from RANs 105 (e.g., from one or more base stations associated with RANs 105), from a Mobility Management Entity ("MME") of a wireless network, from an Access and Mobility Management Function ("AMF") of a wireless network, and/or from some other device or system. UE Location Determination System 101 may receive the location information on an ongoing basis, upon triggering events (e.g., when a particular UE 103 connects to RAN 105, enters a particular area, such as a geofence region, or some other type of triggering event).

UE Location Determination System 101 may provide (at 104) the location information of one or more UEs 103 to Density Alert System 107. In some embodiments, Density Alert System 107 may be, or may be implemented by, a MEC associated with a wireless network. For example, the MEC may be deployed at a base station of the wireless network and/or at some portion of the wireless network other than a core of the wireless network (e.g., at an "edge" of the wireless network), in order to provide lower latency services than devices or systems implemented further away from the edge of the wireless network.

As shown, UE Location Determination System 101 may provide the location information on an ongoing (e.g., periodic or intermittent) basis, and/or based on a triggering event (e.g., when UEs 103 connect to RAN 105, enters or exits a particular region, etc.). Density Alert System 107 may also receive (at 106) region-based density policy information from Regional Policy Repository 109 and/or from some other source. The region-based density policy information may indicate one or more thresholds for density (e.g., population density) in one or more particular geographic regions. For example, the density policy information for one city may indicate a first threshold density (e.g., a maximum of 1 individual per square meter) while the density policy information for another city may indicate a different second threshold density (e.g., a maximum of 2 individuals per square meter). While the preceding example describes "regions" in the context of cities, in practice, the regions may be defined in some other way (e.g., latitude and longitude coordinates, physical addresses, names or identifiers of buildings or landmarks, states, provinces, etc.).

Based on the received UE location information, Density Alert System 107 may determine or estimate a density associated with one or more regions. For example, referring to FIG. 2, Density Alert System 107 may receive location information for a set of UEs 103 located within a particular geographical region 200. Density Alert System 107 may determine or estimate a population density of geographical region 200 based on the received location information. For example, Density Alert System 107 may count a quantity of UEs 103 located within geographical region 200, and/or may apply an estimation factor to the quantity of UEs 103. The estimation factor may account for individuals who are located in geographical region 200, but who may not be in possession of a particular UE 103 and/or for which Density Alert System 107 may otherwise not receive location information. For example, if Density Alert System 107 counts 100 UEs 103 in geographical region 200, the estimated population within geographical region 200 may be 125 (e.g., the counted 100 with an example estimation factor of 1.25 applied). In some embodiments, the estimation factor may be dynamically adjusted using machine learning and/or other suitable techniques.

Figure 2:
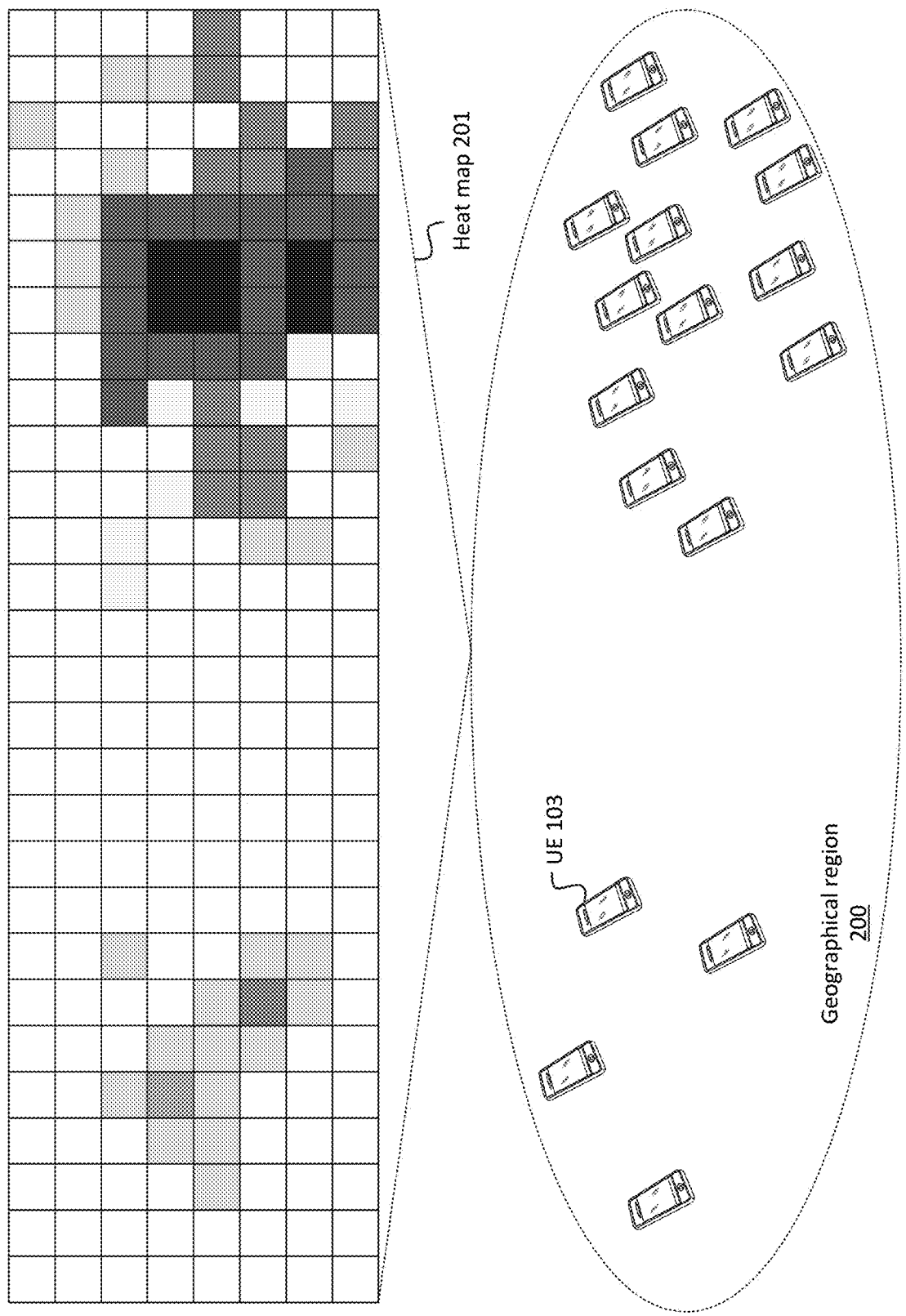
FIG. 2 illustrates an example representation of UE location information based on which some embodiments may determine that a particular geographic location is densely populated.

In some embodiments, Density Alert System 107 may divide or subdivide geographical region 200 into a sub-regions, such as a grid (e.g., as shown in FIG. 2). Density Alert System 107 may identify a population density within each sub-region, which may include counting or estimating a quantity of UEs 103 that are located within each sub-region at a given time. The population density at each sub-region may be represented by heat map 201. In the example of FIG. 2, less densely populated sub-regions may be denoted by lighter shaded squares in the grid, while more densely populated sub-regions may be denoted by darker shared squares in the grid. In some embodiments, Density Alert System 107 may generate heat map 201 or some other visual representation of the identified population density of geographical region 200. In some embodiments, heat map 201 (or other suitable visual representation) may be based on region-based density policy information associated with the particular geographical region 200. For example, the shading may be based on density thresholds indicated by the density policy information for the particular geographical region 200. For example, the shading in heat map 201 may indicate how close the density of a particular sub-region is to a threshold density, may indicate that a particular sub-region exhibits at least a threshold density, and/or may indicate by how much a particular sub-region exceeds a threshold density.

Returning to FIG. 1, Density Alert System 107 may identify (at 108) particular regions that exhibit excessive density, and may output (at 110) one or more alerts based on identifying the particular regions that exhibit excessive density. For example, Density Alert System 107 may output one or more heat maps 201 associated with identified region(s) that exhibit the excessive density. Additionally, or alternatively, Density Alert System 107 may output alerts to UEs 103 that are located within the identified region(s), indicating that excessive density was detected in the region(s). In some embodiments, Density Alert System 107 may output alerts to one or more other entities (e.g., governmental agencies, owners and/or operators of buildings or facilities located within the identified region(s), etc.). For example, such entities may be indicated in region-based policy information.

In some embodiments, Density Alert System 107 may output alerts to one or more UEs 103 that are on headed towards a region with identified excessive density. For example, Density Alert System 107 may identify, based on location information received with respect to a particular UE 103 over time, that the UE 103 is headed in a direction towards such a region. Additionally, or alternatively, Density Alert System 107 may identify that UE 103 is located on a road, train track, and/or other type of transportation methodology that travels to or through the identified region. Additionally, or alternatively, as discussed below, Density Alert System 107 may receive an explicit indication from UE 103 (e.g., based on a navigation request) or from some other source that UE 103 will be heading towards, or will be located in, such a region. Density Alert System 107 may alert UE 103 in such situations that the region is exhibiting excessive population density levels.

Figure 3:
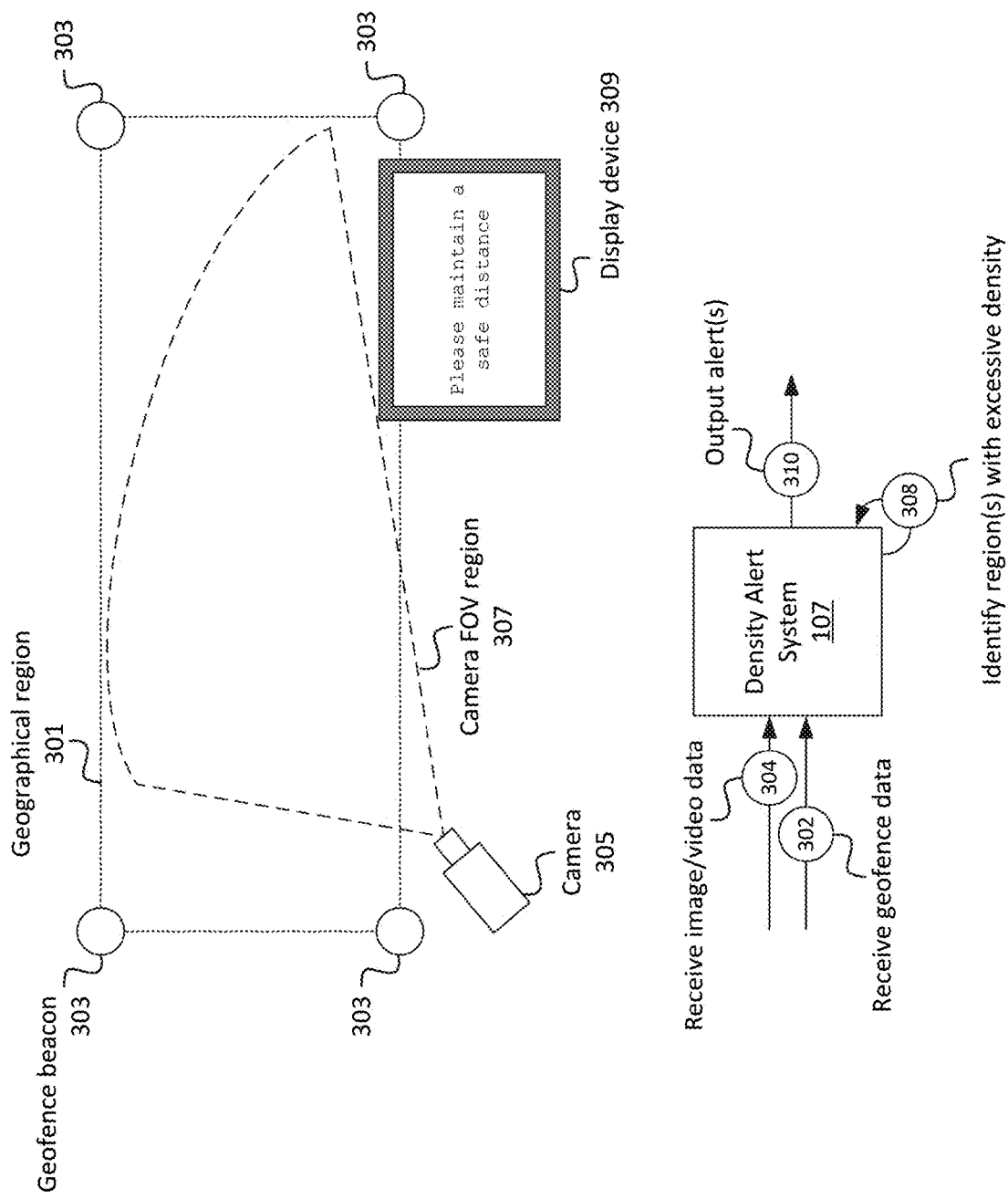
FIG. 3 illustrates an example of geofence and/or visual information based on which some embodiments may determine that a particular geographic location is densely populated.

In some embodiments, Density Alert System 107 may determine population density of a given region based on one or more other factors in addition to, or in lieu of, UE location information (e.g., as described above with respect to FIG. 1). For example, as shown in FIG. 3, a particular geographical region 301 may be defined, abutted, surrounded, etc. by a set of geofence beacons 303. Geofence beacons 303 may include wireless communication capabilities, such as WiFi, Bluetooth, and/or other types of wireless communication capabilities to communicate with and/or to otherwise detect the presence of UEs 103. In this manner, geofence beacons 303 and/or a connected device or system may detect UEs 103 that are in the vicinity (e.g., communication range) of geofence beacons 303, may detect UEs 103 that are within geographical region 301, and/or may detect UEs 103 that enter or exit geographical region 301. In some embodiments, geofence beacons may be fixed devices with a known location, may be movable devices that are associated with a location determination component (e.g., a Global Positioning System ("GPS") component or other suitable location determination function), or may be incorporated within one or more UEs 103. In some embodiments, geofence beacons 303 may be connected to a network and/or may otherwise provide (at 302) information regarding one or more detected UEs 103 to Density Alert System 107.

Additionally, or alternatively, as further shown, camera 305 may capture visual data (e.g., still images and/or video) within a particular field of view ("FOV") region 307. In some embodiments, camera 305 may be a fixed or stationary camera installed at a location, may be handheld camera, or may be incorporated within another device (e.g., UE 103). In some embodiments, camera 305 may be communicatively coupled to a network, and/or may otherwise provide (at 304) captured images or video to Density Alert System 107.

Density Alert System 107 may identify (at 308) that region 301 (e.g., associated with geofence beacons 303 and/or one or more cameras 305) exhibits excessive density based on analyzing the received geofence and/or image data. For example, Density Alert System 107 may detect that at least a threshold quantity of UEs 103 have been detected by geofence beacon 303, and/or may perform an image analysis (e.g., using computer vision or other suitable techniques) of image or video data received from camera 305 to determine that at least a threshold quantity of individuals (or a threshold density, which may be based on a detected quantity of individuals as well as a size of region 301) are depicted in the image or video data. In some embodiments, such identification (at 308) may be performed in concert with, or in lieu of, the analysis (at 108) of UE location information.

In some embodiments, the analysis (at 308) of image data may be used to refine an estimation factor used to estimate a quantity of individuals based on a quantity of detected UEs 103. For example, if Density Alert System 107 receives (at 104) information indicating that 50 UEs 103 are present in region 301, and further receives (at 304) image data depicting 75 individuals in region 301, Density Alert System 107 may refine an estimation factor (e.g., which may be applied to region 301 and/or other regions) based on determining that 1.5 times the quantity of individuals have been identified as compared to the quantity of UEs 103 detected in the same region 301.

In some embodiments, Density Alert System 107 may output (at 310) one or more alerts when detecting excessive population density at region 301. For example, Density Alert System 107 may output an alert to display device 309, which may be located within and/or otherwise associated with region 301. The alert may include a message such as "Please maintain a safe distance" or some other message. As similarly described above, Density Alert System 107 may output alerts to one or more UEs 103 that have been detected within region 301, UEs 103 that are headed towards region 301, and/or one or more other entities as similarly discussed above.

Figure 4:
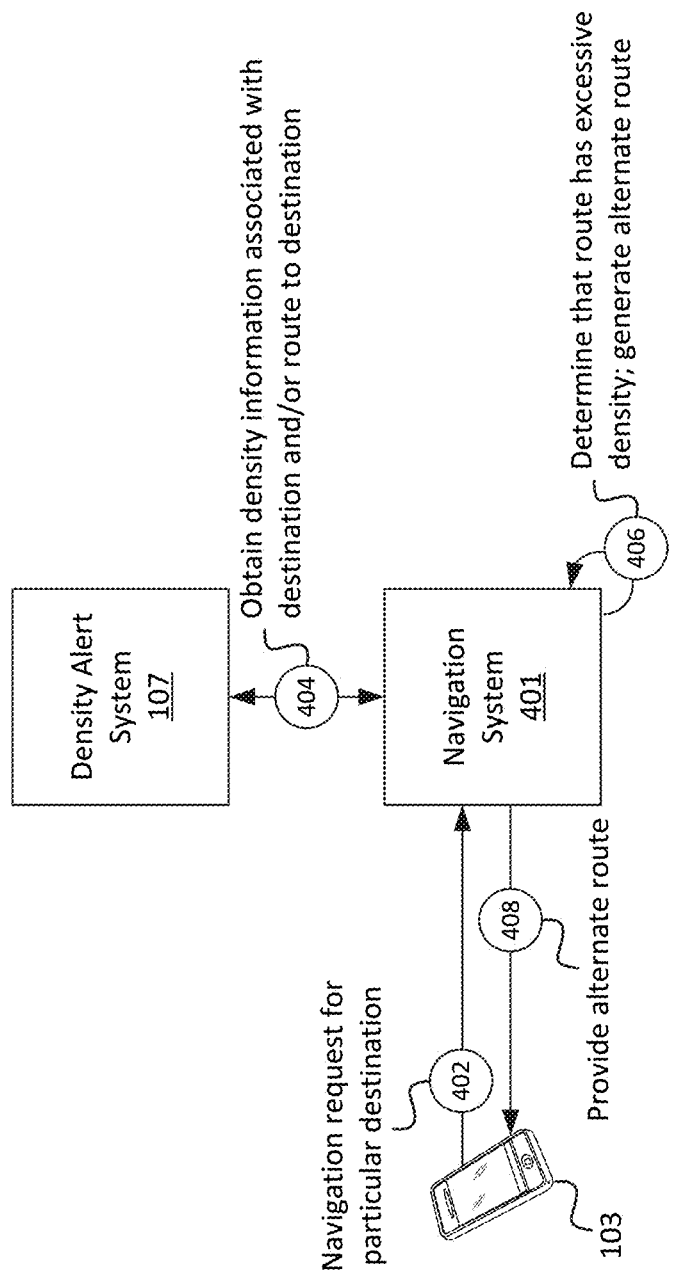
FIG. 4 illustrates an example of a navigation system providing an alternate route based on determining excessive population densities along a route associated with a navigation request.

FIG. 4 illustrates an example of alerting a particular UE 103 based on a navigation request from UE 103. For example, as shown, UE 103 may output (at 402) a request to navigate to a particular destination. The request may be received by Navigation System 401, which may be an application server or some other suitable device or system that provides navigation instructions based on a desired destination. In some embodiments, Navigation System 401 may be partially or entirely implemented by UE 103 (e.g., may be, or may include, an "app" executing at UE 103).

Navigation System 401 may communicate with Density Alert System 107 via an API or other suitable communication pathway. As shown, for example, Navigation System 401 may obtain (at 404) density information associated with the requested destination, and/or associated with a route between a designated start point (e.g., a current location of UE 103 or some other start point for the route as received from UE 103) and the destination. For example, Navigation System 401 may request density information (e.g., as determined by Density Alert System 107 at 108 and/or 308). Density Alert System 107 may provide an indication of whether the destination or any locations along the route exhibit excessive density, may provide a score indicating how dense such locations are, may provide raw values indicating a quantity of UEs 103 or individuals detected at such locations, and/or may otherwise provide a measure of density at the destination or along the route.

In the example provided in FIG. 4, assume that Density Alert System 107 provides (at 404) information based on which Navigation System 401 determines (at 406) that the route exhibits excessive density. Navigation System 401 may accordingly generate an alternate route to the destination, which does not exhibit excessive density (and/or exhibits less density than the original route).

In some embodiments, Navigation System 401 may take the route into account when the navigation request (at 402) indicates that a user will be walking or taking public transit (e.g., a bus, train, or the like) to the destination, and/or when such travel modes are otherwise associated with the route. In some embodiments, Navigation System 401 may forgo taking the route into account when the navigation request includes driving directions, and/or when the navigation request does not include walking or public transit modes. Generally, if the user is expected to be within a private vehicle (e.g., his or her own car), then the route between the start point and the destination may not need to be altered even if the route is densely populated. On the other hand, if the user is expected to be on foot or within potential contact of other individuals, then Navigation System 401 may determine that the route should be altered so as to avoid such contact.

Figure 5:
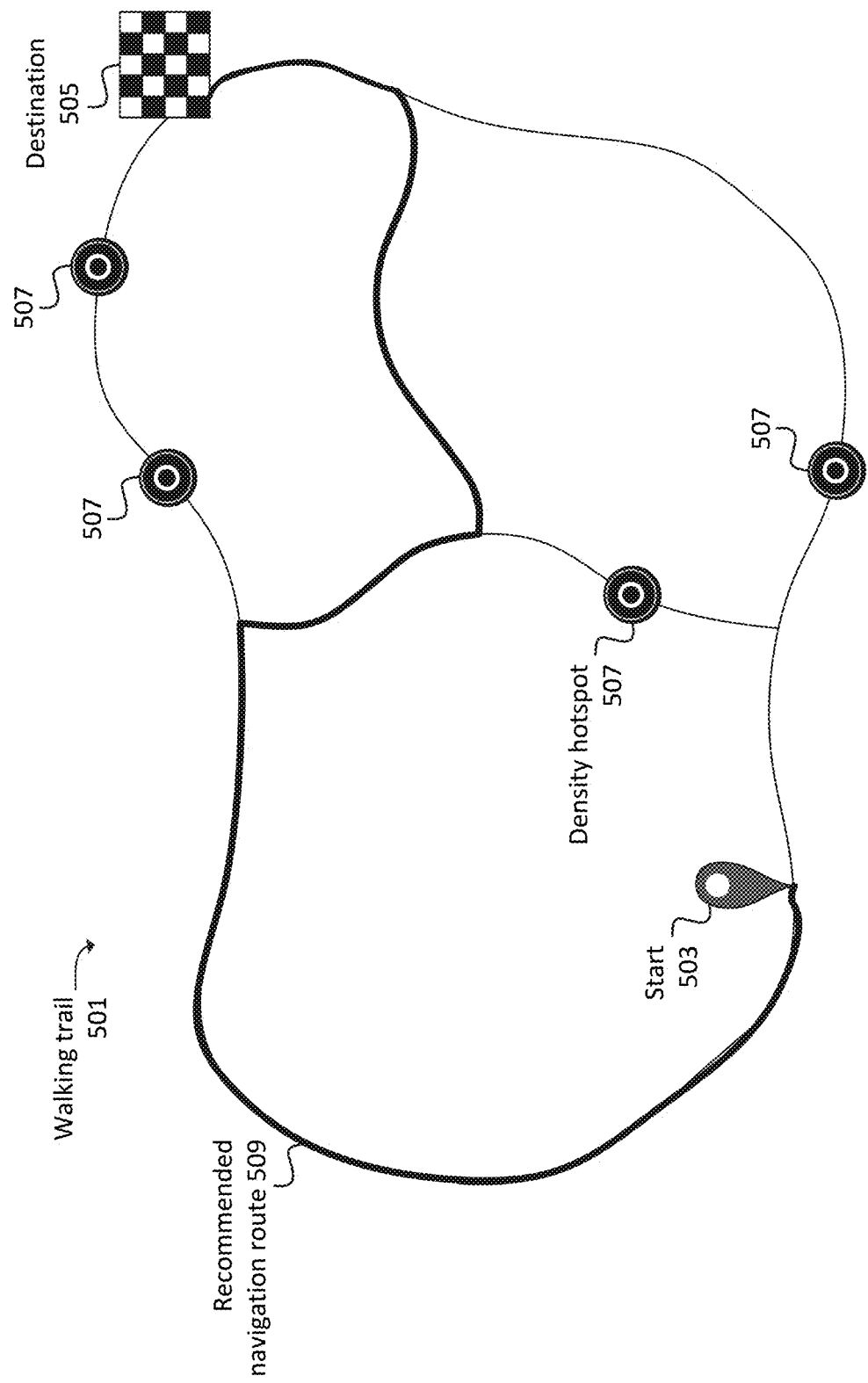
FIG. 5 illustrates an example route which may be generated based on determined population densities in a region associated with a navigation request.

For example, as shown in FIG. 5, a user may request navigation directions on a walking trail 501, which is depicted in FIG. 5 in an overhead view. The user may, for example, request walking directions from start point 503 to destination 505. Density Alert System 107 and/or Navigation System 401 may identify one or more density hotspots 507 on walking trail 501. Such hotspots 507 may be, for example, locations or regions at which excessive density have been identified. Based on identifying such hotspots 507, Navigation System 401 may generate recommended navigation route 509 from start point 503 to destination 505, which may avoid hotspots 507. Thus, while route 509 may not be the shortest route, route 509 may nevertheless be favorable in that density hotspots 507 are avoided.

Figure 6:
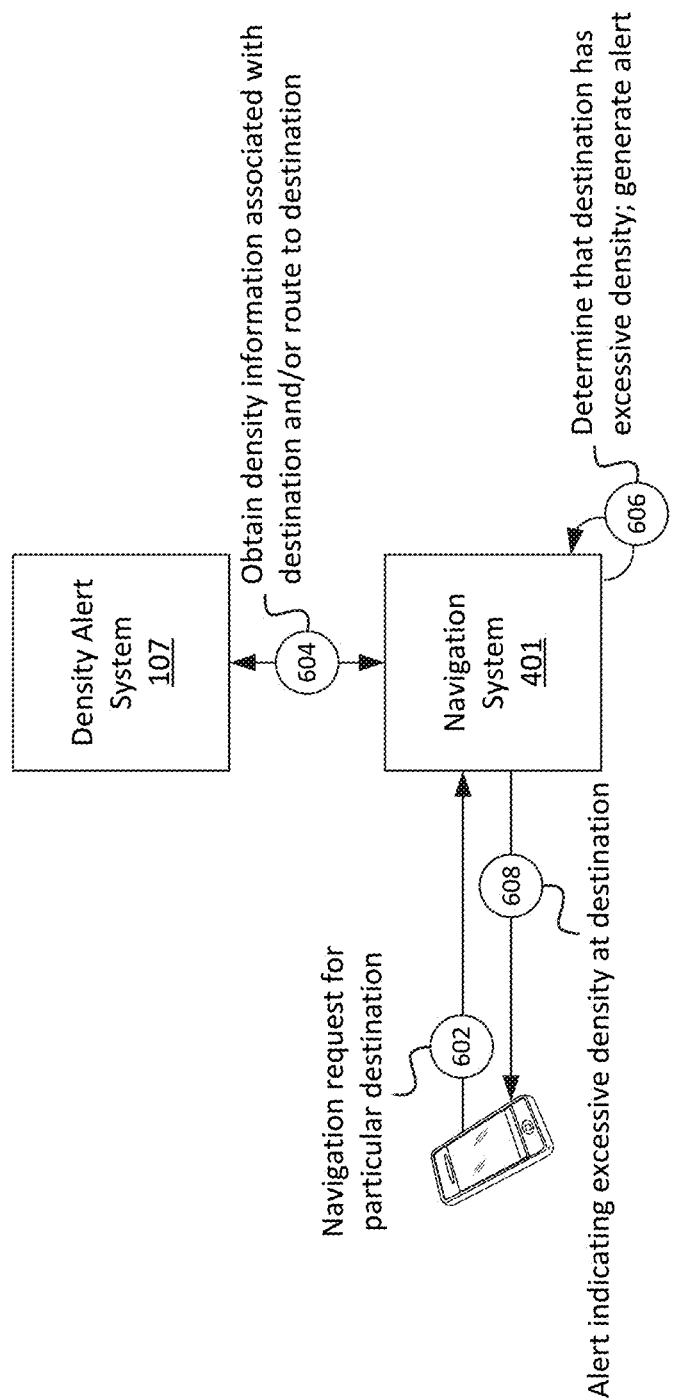
FIG. 6 illustrates an example of providing an alert when determining that a requested destination is densely populated.

As shown in FIG. 6, as another example of alerting UE 103 based on a navigation request (at 602), density information (obtained at 604) associated with a requested destination, and determining (at 606) that the destination exhibits excessive density, Navigation System 401 may output (at 608) an alert to UE 103 indicating that the destination exhibits excessive density. A user of UE 103 may accordingly opt to wait until the destination does not exhibit excessive density before proceeding to the destination. In some embodiments, Navigation System 401 and/or Density Alert System 107 may continue to monitor the destination, and may output an alert or notification to UE 103 indicating that the destination no longer exhibits excessive density. In this manner, a user of UE 103 may proceed to the destination once the density has fallen below a threshold density.

Figure 7A:
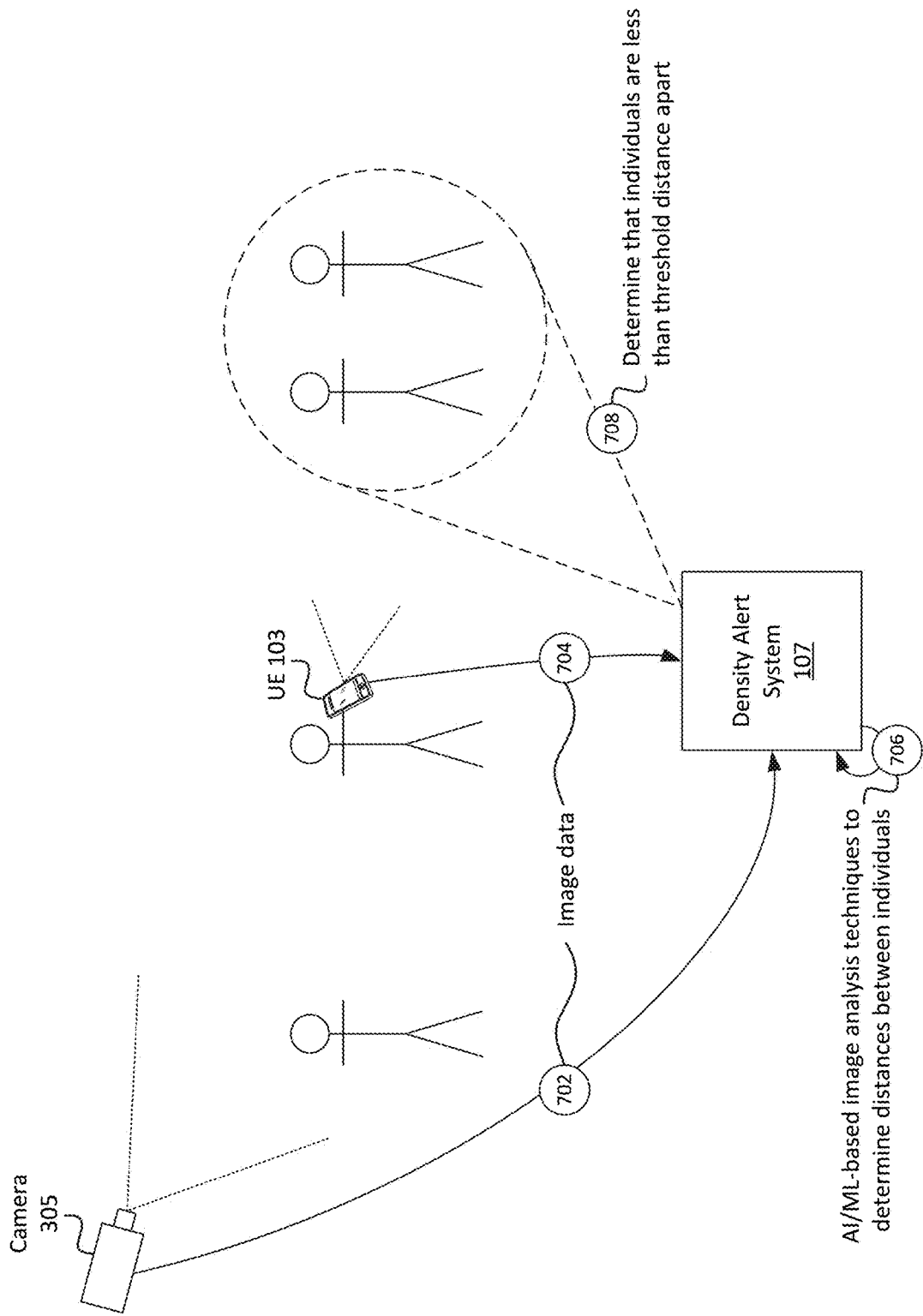
FIG. 7A illustrates an example of identifying individuals who are not maintaining at least a threshold level of distance, in accordance with some embodiments.

As shown in FIG. 7A, for example, camera 305 may capture still images and/or video of a given location. In the example shown here, camera 305 may capture still images and/or video of individuals who are located within a field of view of camera 305. In some embodiments, camera 305 may output (at 702) image data to Density Alert System 107. As further shown in FIG. 7A, image data may be captured by UE 103, which may include a camera or other image capture device. For example, an individual at the location associated with camera 305 may use UE 103 to capture image data associated with the same location. The image data captured by UE 103 may generally depict the same visual information as captured by camera 305, and/or may have varying attributes from the image data captured by camera 305 (e.g., captured from different heights or angles, having differing focal points, captured at different times, having differing image quality, etc.).

In some embodiments, UE 103 may have functionality to capture image data and output (at 704) such image data to Density Alert System 107. For example, UE 103 may have an application (or "app") installed that is configured to capture image data and/or provide captured image data to Density Alert System 107, may implement an API via which UE 103 provides image data to Density Alert System 107, and/or may otherwise provide (at 704) image data to Density Alert System 107.

As depicted in the example of FIG. 7A, some individuals may be located closer to each other than other individuals. For example, the two individuals on the right may be situated within a threshold distance of each other (e.g., two meters, one meter, or some other threshold distance), while the two individuals on the left may each be situated greater than the threshold distance from other individuals. The image data (provided at 702 and/or 704) may depict some or all of the individuals shown in FIG. 7A. For example, the image data provided by camera 305 may depict all four of the individuals shown in FIG. 7A. As another example, UE 103 may be device associated with one of the four individuals, and may depict the two individuals on the right. For example, the individual holding UE 103 may notice that the two individuals on the right are not maintaining an appropriate level of distance.

As further shown, Density Alert System 107 may perform image analysis techniques, including machine learning and/or artificial intelligence ("AI")-based image analysis techniques, computer vision techniques, and/or other suitable techniques to determine (at 706) distances between the individuals depicted in the image data (received at 702 and/or 704). For example, Density Alert System 107 may use such techniques to analyze the image data to identify that the image data depicts individuals, and may further use such techniques to determine distances between the individuals.

In some embodiments, Density Alert System 107 may utilize multiple images at multiple times to analyze the image data and determine distances between depicted individuals. For example, Density Alert System 107 may receive multiple images from camera 305 (e.g., captured at a one-second interval, captured at a $\frac{1}{30}$th of a second interval, and/or at some other interval) and/or multiple images from Density Alert System 107. Based on the multiple images, Density Alert System 107 may determine whether individuals are situated within a threshold distance of each other temporarily (e.g., may momentarily approach each other and then return to at least the threshold distance apart) or if such individuals are situated within the threshold distance on a less temporary basis (e.g., are standing and facing each other, are within the threshold distance of each other for greater than a threshold amount of time, are walking in the same direction, etc.).

In some embodiments, Density Alert System 107 may utilize images from different sources (e.g., from camera 305 and UE 103 and/or other sources) to determine distances between individuals. For example, Density Alert System 107 may use machine learning and/or AI techniques, computer vision techniques, and/or other suitable techniques to identify that image data from camera 305 and UE 103 depicts the same individuals from different angles or vantage points, and may use such image data to more accurately detect distances between such individuals.

In some embodiments, Density Alert System 107 may receive and/or may otherwise be configured with policy information, specifying a minimum threshold distance between individuals. For example, Density Alert System 107 may receive such information from Regional Policy Repository 109 and/or some other source.

Based on the analysis (at 706) of the image data (e.g., as received at 702 and/or 704) and the policy information specifying the minimum threshold distance between individuals, Density Alert System 107 may determine (at 708) that certain individuals are less than the threshold distance apart. For example, as shown in FIG. 7A and as denoted by the dashed circle, Density Alert System 107 may determine that the two individuals on the right of the figure are less than the threshold distance apart. For example, as discussed above, Density Alert System 107 may determine that these individuals have been less than the threshold distance apart for at least a threshold amount of time (e.g., at least one minute, at least 30 seconds, etc.), that these individuals are facing each other, or that these individuals are walking in substantially the same direction.

Figure 7B:
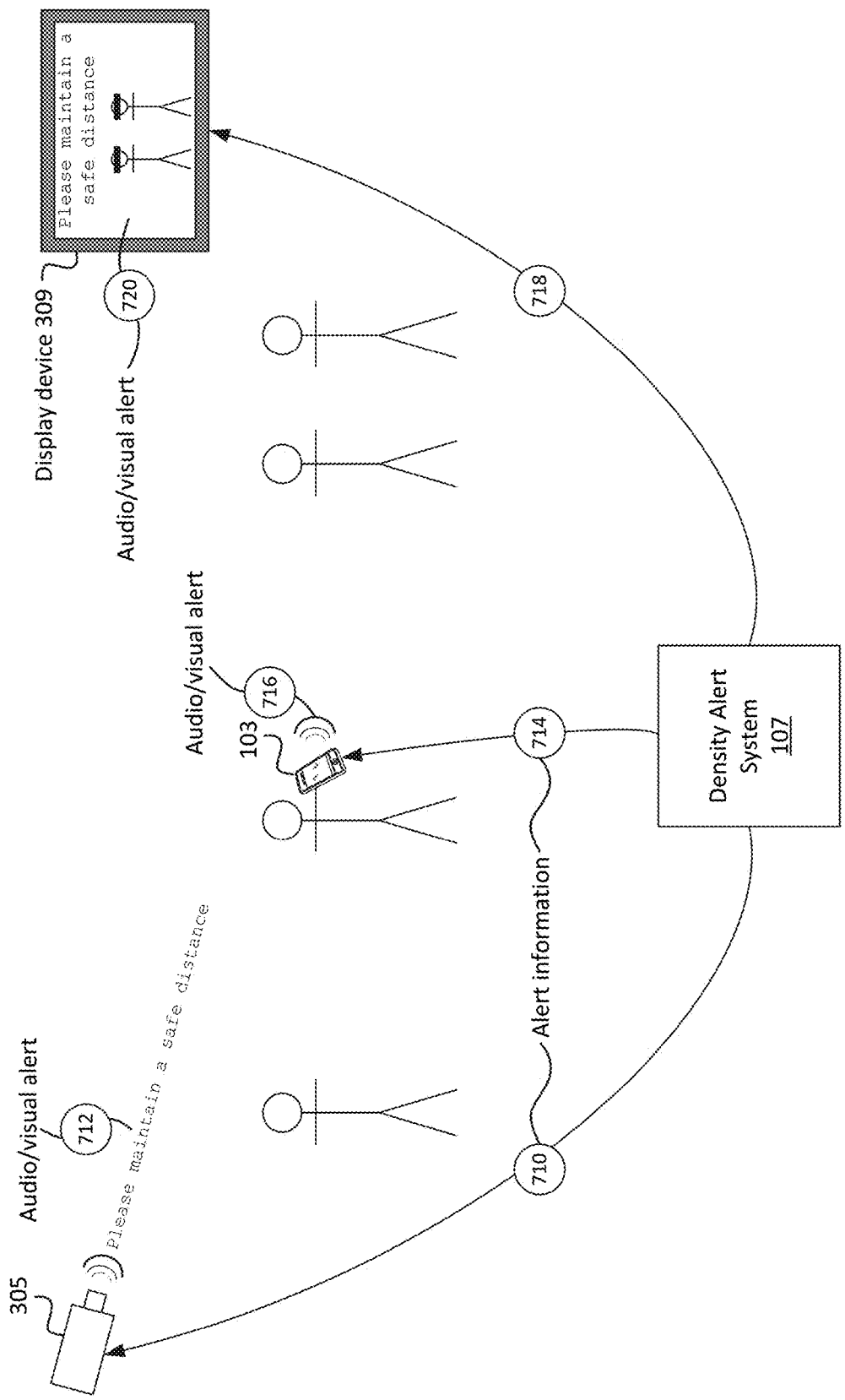
FIG. 7B illustrates an example of outputting alerts to devices that are in a proximity of identified individuals who are not maintaining at least a threshold level of distance, in accordance with some embodiments.

Based on determining (at 708) that particular individuals are not situated at least the threshold distance apart from each other, Density Alert System 107 may take one or more remedial measures. For example, as shown in FIG. 7B, Density Alert System 107 may output (at 110) alert information to camera 305. The alert information may include instructions to output an audible and/or visible alert (e.g., in situations where camera 305 includes or is associated with an audio output component such as a speaker or a visual output component such as a spotlight or display device). The alert information may vary based on capabilities of a given recipient device of the alert information.

For example, Density Alert System 107 may receive information associated with camera 305, indicating capabilities of camera 305. For example, a registration process may be performed by which Density Alert System 107 is notified that camera 305 is associated with a speaker and a spotlight, and/or Density Alert System 107 may receive such capability information associated with camera 305 at some other time and/or from some source other than camera 305. Accordingly, in some embodiments, the alert information (provided at 110) may include instructions to actuate the speaker and/or the spotlight, based on the detection that individuals within the field of view of camera 305 are not maintaining at least the threshold distance. For example, Density Alert System 107 may instruct (at 710) camera 305 to output (at 712) an audible alert, such as "Please maintain a safe distance." Additionally, or alternatively, Density Alert System 107 may instruct camera 305 to shine (at 712) a spotlight or other type of light based on detecting the individuals not maintaining the threshold distance.

In some embodiments, the volume, intensity, etc. associated with the alert information (provided at 710) may vary based on parameters of the image data (received at 702 and/or 704). For example, based on analyzing (at 706) the image data, Density Alert System 107 may determine how far the individuals are from camera 305, and may vary the volume of audible alerts or intensity of visual alerts based on such distance. For example, if Density Alert System 107 determines based on the analysis that the detected individuals are relatively far away from camera 305, Density Alert System 107 may instruct (at 710) camera 305 to play a relatively loud alert and/or actuate a spotlight with relatively high intensity or brightness. On the other hand, if Density Alert System 107 determined that the detected individuals are relatively close to camera 305, Density Alert System 107 may instruct (at 710) camera 305 to play a relatively soft alert and/or actuate a spotlight with relatively low intensity or brightness.

In some embodiments, the volume, intensity, etc. associated with the alert information may vary based on a type of activity and/or other attributes of individuals depicted in image data. For example, if Density Alert System 107 determines based on the analysis (at 706) of image data that the individuals are in conversation with one another, then Density Alert System 107 may instruct (at 710) camera 305 to play a relatively loud audible alert. As another example, if Density Alert System 107 determines that the individuals are walking towards camera 305, then Density Alert System 107 may instruct camera 305 to play a relatively less loud audible alert. As noted above, Density Alert System 107 may use machine learning and/or AI techniques, computer vision techniques, and/or other suitable techniques (e.g., on individual still images, sequences of still images, or video) to classify individuals depicted in image data as being associated with certain activities (e.g., conversing, walking, etc.).

In some embodiments, Density Alert System 107 may output (at 714) alert information to UE 103. For example, Density Alert System 107 may output (at 714) the alert information to UE 103 in response to receiving (at 704) image data from UE 103 and determining (at 108) that individuals depicted in the image data are not at least a threshold distance apart from each other. UE 103 may, accordingly, output (at 716) an audible and/or visual alert. For example, the alert (at 716) may include a flashing of a light or display screen associated with UE 103 and/or a sound from a speaker of UE 103 (e.g., a siren, an utterance such as "please maintain a safe distance," etc.).

Additionally, or alternatively, Density Alert System 107 may output (at 718) alert information to display device 309, which may be a fixed display device located within a threshold distance of camera 305 or UE 103. Display device 309 may present (at 720) an audible and/or visual alert. For example, display device 309 may display video or images (e.g., as received from UE 103 and/or camera 305) depicting individuals who have been identified as being within a threshold distance of each other. In some embodiments, when providing such alert information (e.g., video or image data) depicting such individuals, Density Alert System 107 may provide anonymity-protecting information, such as black bars over individuals' faces, blurring of individuals' faces, or the like.

Figure 8A:
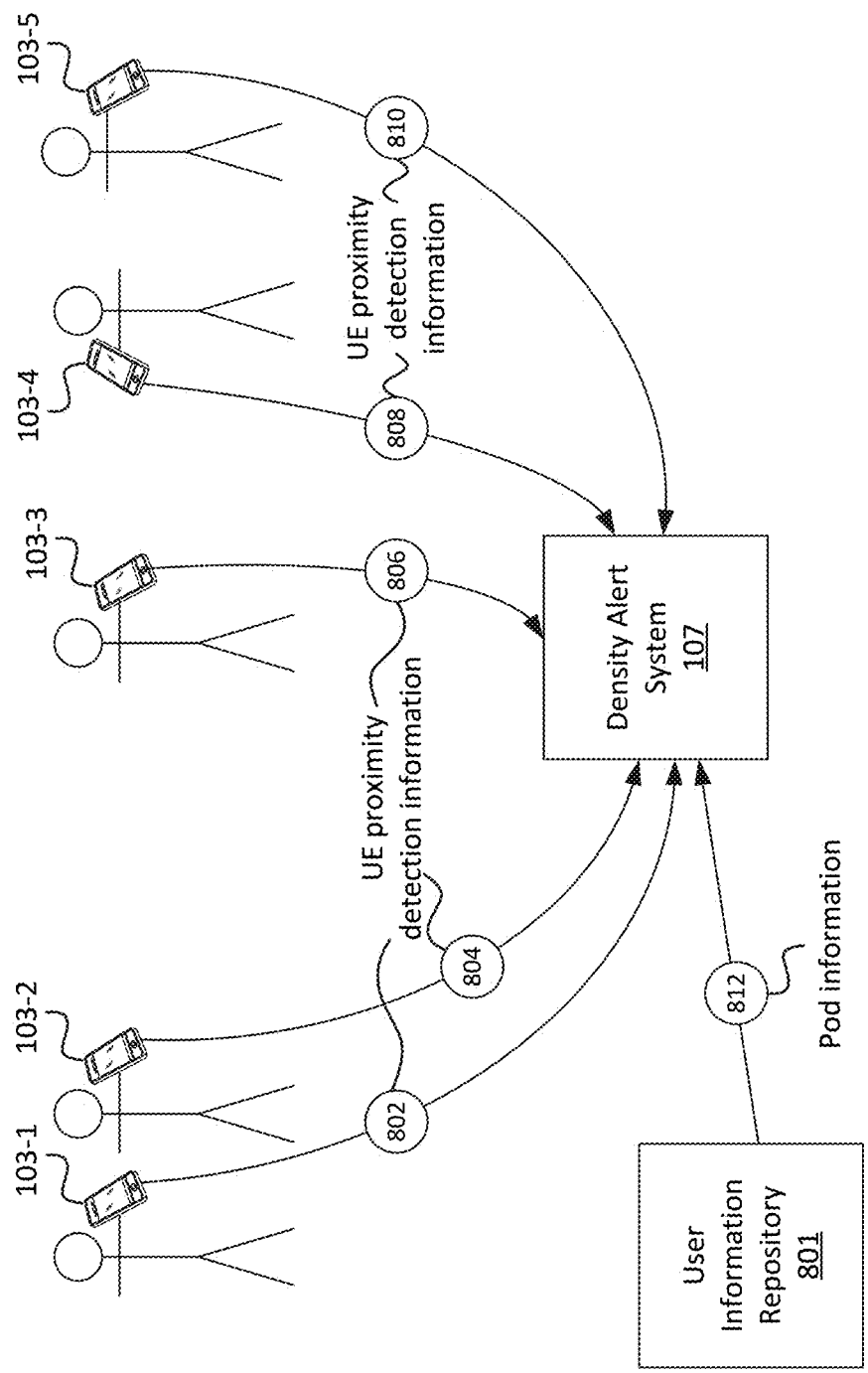
FIG. 8A illustrates an example of receiving proximity detection information from one or more UEs, in accordance with some embodiments.

In some embodiments, as shown in FIG. 8A, Density Alert System 107 may receive (at 802-810) UE proximity information from one or more UEs 103. For example, as shown, UEs 103-1 through 103-5 may detect the presence of one another based on wireless beacon information and/or other suitable detectable presence information output by UEs 103-1 through 103-5. For example, such UEs 103 may periodically or intermittently output discoverable wireless beacon signals, such that other UEs 103 may detect such signals. In some embodiments, proximity between two respective UEs 103 may be determined based on a signal strength or other suitable metrics associated with received beacon signals.

In this manner, Density Alert System 107 may be able to determine UEs 103 that are within a threshold distance of one another. As further shown in FIG. 8A, Density Alert System 107 may receive (at 812) pod information from User Information Repository 801 (e.g., a Home Subscriber Server ("HSS") associated with a wireless network, a Unified Data Management function ("UDM") associated with a wireless network, and/or some other device or system). A "pod," as referred to herein, may be a group of UEs 103 for which distance detection may not need to be enforced. Generally, for example, a pod may be associated with a family, a household, an organization, and/or some other grouping of UEs 103. Each pod may include, for example, a group of UEs 103 associated with a same account or subscription, a group of UEs 103 that have been identified as being routinely located at the same location on a repeating basis (e.g., located at the same physical address every night), a group of UEs 103 that have been manually indicated as being associated with the same pod, etc.

Figure 8B:
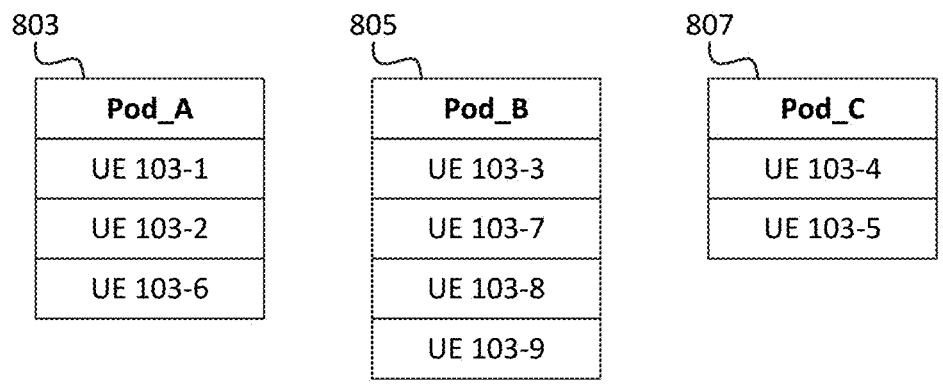
FIG. 8B illustrates an example of pod information, which may be used to determine whether particular UEs that are within a threshold proximity are in the same pod, in accordance with some embodiments.

As shown in FIG. 8B, for example, pod information 803 (e.g., as maintained by and/or received from User Information Repository 801) may indicate that a first group of UEs 103 (e.g., UEs 103-1, 103-2, and 103-6) are associated with a first pod ("Pod_A"), pod information 805 may indicate that a second group of UEs 103 are associated with a second pod, and pod information 807 may indicate that a third group of UEs 103 are associated with a third pod.

Figure 8C:
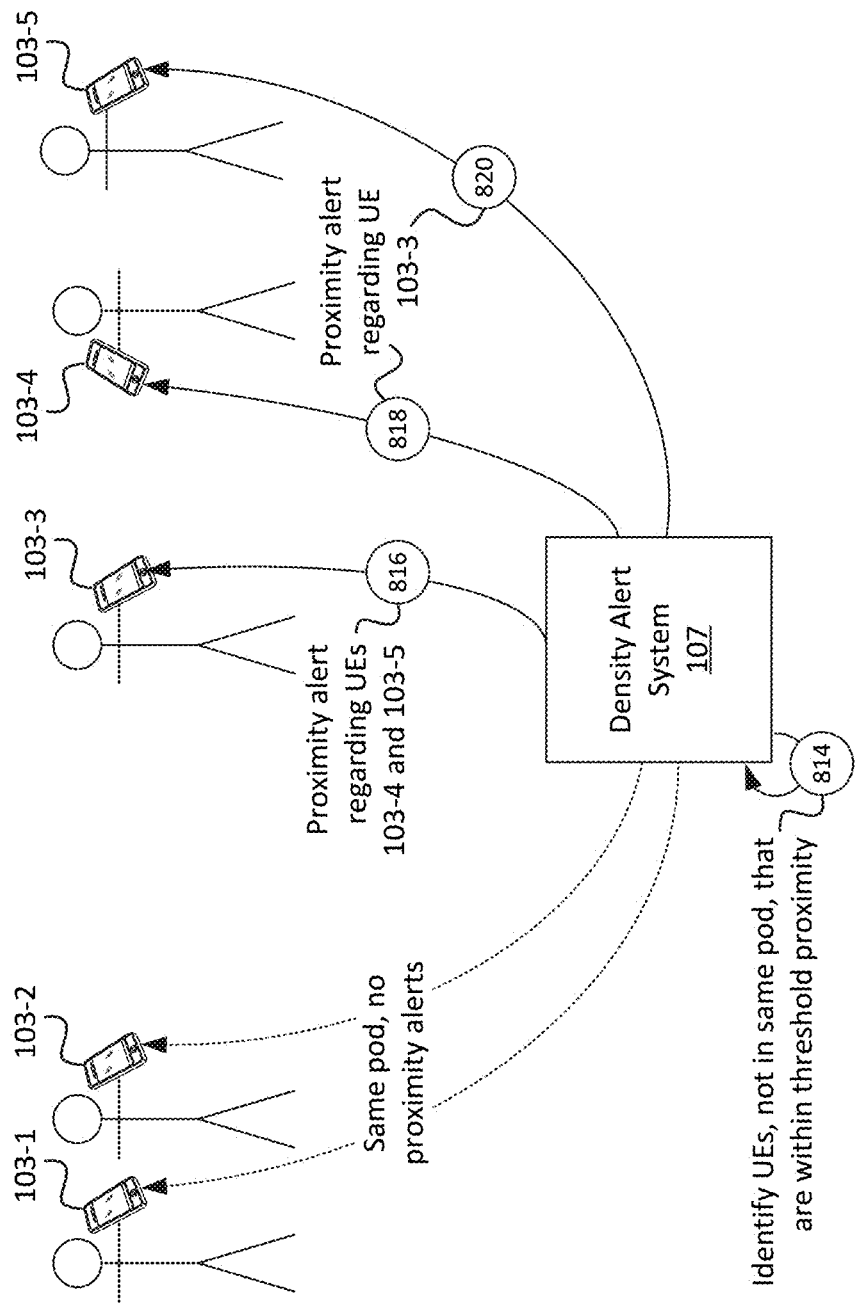
FIG. 8C illustrates an example of outputting alerts to UEs that are within a threshold proximity of each other and are not in the same pod, in accordance with some embodiments.

Based on the example pod information 803-805, and as shown in FIG. 8C, Density Alert System 107 may identify (at 814) UEs 103 that are not in the same pod and are within a threshold proximity. For example, as shown in FIG. 8C, UE 103-3 may be located within a threshold distance of UEs 103-4 and 103-5. Accordingly, Density Alert System 107 may output (at 816) an alert to UE 103-3, indicating that UEs 103-4 and 103-5 are located within a threshold proximity of UE 103-3, and that UEs 103-4 and 103-5 are not in the same pod as UE 103-3. Similarly, Density Alert System 107 may output (at 818 and 820) alerts to UEs 103-4 and 103-5, respectively, indicating that UE 103-3 is within a threshold proximity of UEs 103-4 and 103-5, and that UE 103-3 is not in the same pod as UEs 103-4 and 103-5.

As further shown (and as indicated by the dashed lines in FIG. 8C), Density Alert System 107 may not output alerts to UEs 103-1 and 103-2, even if such UEs are within a threshold proximity of each other. For example, as reflected by pod information 803, UEs 103-1 and 103-2 may be in the same pod, and such proximity alerts may therefore be unnecessary. Similarly, the alerts sent (at 818 and 820) to UEs 103-4 and 103-5 may not include alerts about each other, as UEs 103-4 and 103-5 may be in the same pod (e.g., as reflected by pod information 807).

Figure 9:
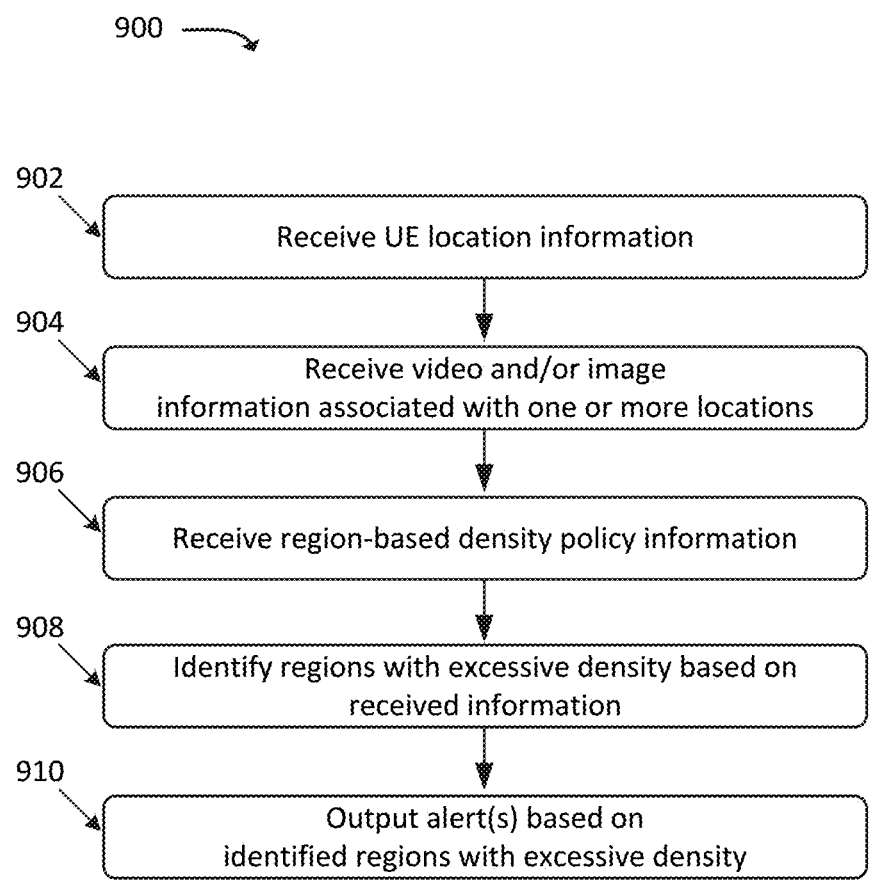
FIG. 9 illustrates an example process for detecting regions that exhibit excess density and outputting alerts based on detecting regions that exhibit excess density, in accordance with some embodiments.

FIG. 9 illustrates an example process 900 for detecting regions that exhibit excess density and outputting alerts based on detecting regions that exhibit excess density. In some embodiments, some or all of process 900 may be performed by Density Alert System 107. In some embodiments, one or more other devices may perform some or all of process 900 in concert with, and/or in lieu of, Density Alert System 107.

As shown, process 900 may include receiving (at 902) UE location information. For example, as discussed above, Density Alert System 107 may receive (e.g., on an ongoing basis) information regarding the geographic locations of one or more UEs 103. Density Alert System 107 may receive such information from UE Location Determination System 101, UEs 103, and/or one or more other devices or systems that determine, monitor, track, etc. location information of UEs 103.

Process 900 may further include receiving (at 904) video and/or image information associated with one or more locations. For example, Density Alert System 107 may receive such information from one or more UEs 103 (e.g., UEs that have an integrated or otherwise connected camera), camera 305, and/or some other source. The video and/or image information may be provided along with metadata or other suitable information indicating a location associated with the provided video and/or image data, such that Density Alert System 107 is able to identify location information associated with particular video and/or image data.

Process 900 may additionally include receiving (at 906) region-based density policy information. For example, Density Alert System 107 may receive density policy information, indicating threshold densities for certain locations, regions, areas, etc. Further, in some embodiments, the density policy information may indicate actions to take when threshold densities are detected. For example, density policy information for one region may indicate that an alert should be sent to an owner or operator of an establishment when at least a threshold density is detected at that establishment, while density policy information for another region may indicate that an alert should be sent to a display device 309 when at least a threshold density is detected in that region.

Process 900 may also include identifying (at 908) regions with excessive density. For example, based on the UE location information (received at 902), video and/or image information (received at 904), and/or other information (e.g., UE proximity information discussed above with respect to FIG. 8A and/or other suitable information), Density Alert System 107 may detect one or more regions that are associated with at least a threshold density (e.g., based on density policy information associated with the respective regions).

Process 900 may further include outputting (at 910) one or more alerts based on the identified regions. For example, as discussed above, the type of alert may be specified in the policy information. Additionally, or alternatively, the type of alert may be based on the type of information received (e.g., at 902 and/or 904). For example, if Density Alert System 107 receives (at 902) UE location information, the alert may include outputting one or more alerts to UEs 103 associated with an identified region with excessive density. As another example, Density Alert System 107 may provide alerts to UEs 103 that are moving toward the identified region, that have output a navigation request that indicates a destination within the identified region, and/or other types of alerts discussed above.

Figure 10:
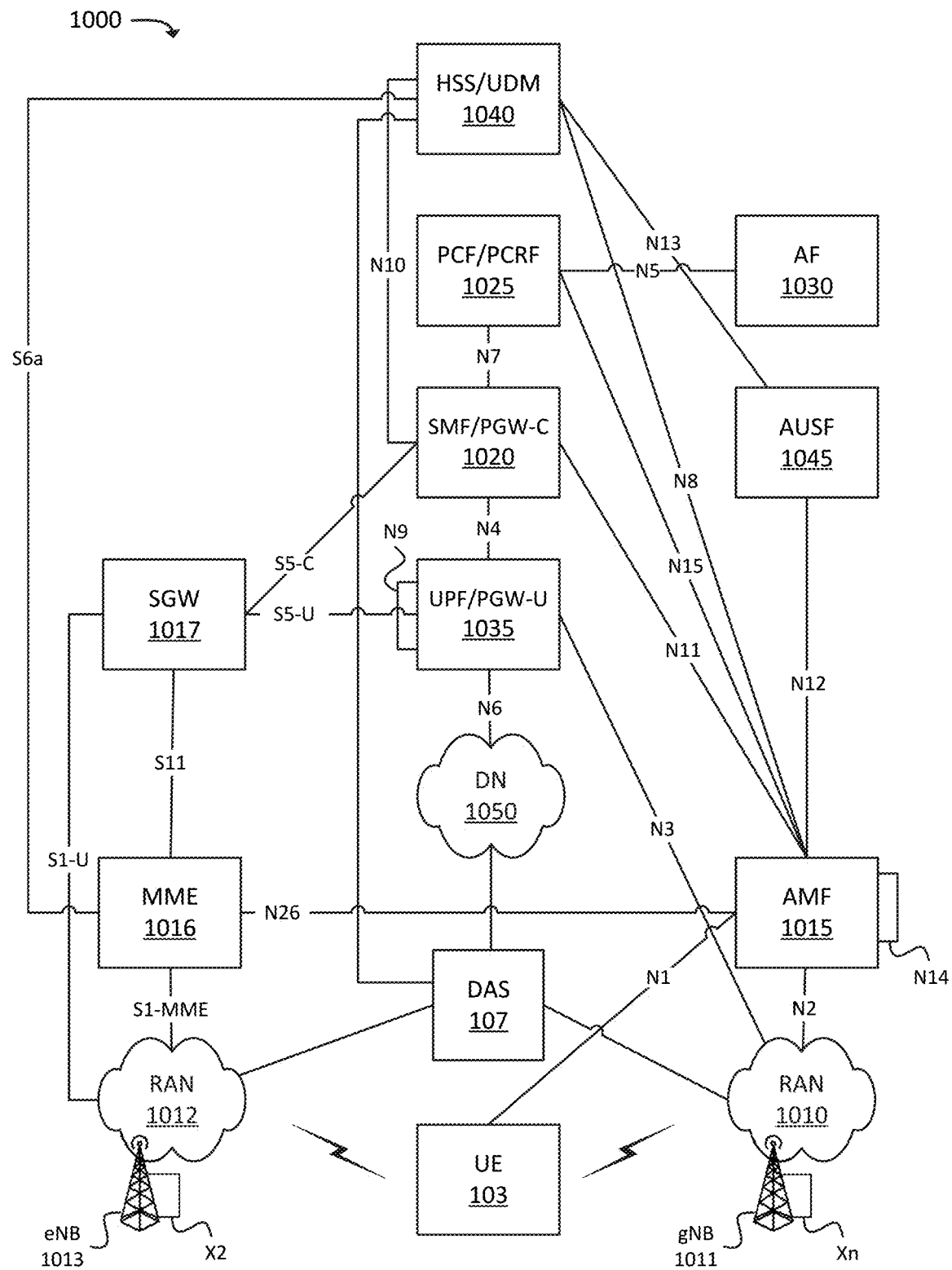
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include UE 103, RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, HSS/UDM 1040, Authentication Server Function ("AUSF") 1045, and Density Alert System 107. Environment 1000 may also include one or more networks, such as Data Network ("DN") 1050.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 103 may include a computation and communication device, such as a wireless mobile communication device that is capable of communicating with RAN 1010, RAN 1012, and/or DN 1050. UE 103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 103 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 103 may communicate with one or more other elements of environment 1000. UE 103 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 103 via the air interface, and may communicate the traffic to UPF/PGW-U 1035, and/or one or more other devices or networks. Similarly, RAN 1010 may receive traffic intended for UE 103 (e.g., from UPF/PGW-U 1035, AMF 1015, and/or one or more other devices or networks) and may communicate the traffic to UE 103 via the air interface.

RAN 1012 may be, or may include, a LTE RAN that includes one or more base stations (e.g., one or more eNBs 1013), via which UE 103 may communicate with one or more other elements of environment 1000. UE 103 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 103 via the air interface, and may communicate the traffic to UPF/PGW-U 1035, and/or one or more other devices or networks. Similarly, RAN 1010 may receive traffic intended for UE 103 (e.g., from UPF/PGW-U 1035, SGW 1017, and/or one or more other devices or networks) and may communicate the traffic to UE 103 via the air interface. In some embodiments, RAN 1010 and/or RAN 1012 may include, may implement, and/or may be communicatively coupled to UE Location Determination System 101, in order to provide up-to-date location information associated with UE 103.

AMF 1015 may include one or more devices, systems, Virtualized Network Functions ("VNFs"), etc., that perform operations to register UE 103 with the 5G network, to establish bearer channels associated with a session with UE 103, to hand off UE 103 from the 5G network to another network, to hand off UE 103 from the other network to the 5G network, manage mobility of UE 103 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 103 with the EPC, to establish bearer channels associated with a session with UE 103, to hand off UE 103 from the EPC to another network, to hand off UE 103 from another network to the EPC, manage mobility of UE 103 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 103. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 103, from DN 1050, and may forward the user plane data toward UE 103 (e.g., via RAN 1010, SMF/PGW-C 1020, and/or one or more other devices). In some embodiments, multiple UPFs 1035 may be deployed (e.g., in different geographical locations), and the delivery of content to UE 103 may be coordinated via the N9 interface (e.g., as denoted in FIG. 10 by the line marked "N9" originating and terminating at UPF/PGW-U 1035). Similarly, UPF/PGW-U 1035 may receive traffic from UE 103 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 103. In some embodiments, HSS/UDM 1040 may implement, may include, and/or may be communicatively coupled with, Regional Policy Repository 109. In some such embodiments, HSS/UDM 1040 may provide region-based policy information to Density Alert System 107.

Density Alert System 107 may include one or more devices, systems, VNFs, etc., that perform one or more operations described herein. For example, Density Alert System 107 may identify regions with excessive population density based on information received from Regional Policy Repository 109, one or more UEs 103, UE Location Determination System 101, and/or one or other devices or systems, and may output alerts when excessive population density is detected.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 103 may communicate, through DN 1050, with data servers, other UEs 103, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 103 may communicate.

Figure 11:
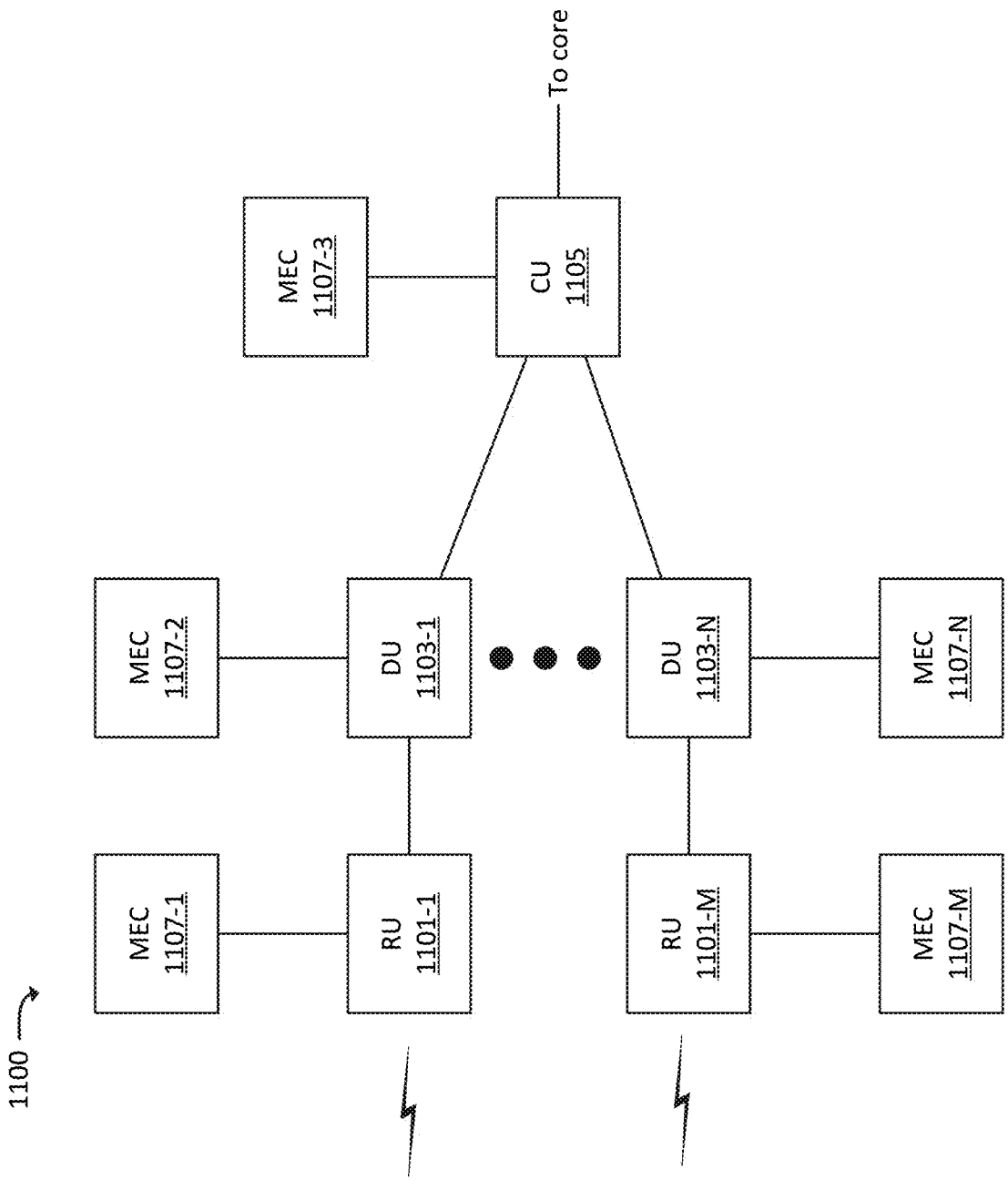
FIG. 11 illustrates an example arrangement of a radio access network ("RAN"), in accordance with some embodiments.

FIG. 11 illustrates an example Distributed Unit ("DU") network 1100, which may be included in and/or implemented by one or more RANs (e.g., RAN 1010). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 103 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 103, and may determine which DU(s) 1103 should receive the downlink traffic. DU 1103 may include one or more devices that transmit traffic between a core network (e.g., via CU 1105) and UE 103 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 103.

RU 1101 may include hardware circuitry (e.g., one or more RF transceivers, antennas, radios, and/or other suitable hardware) to communicate wirelessly (e.g., via an RF interface) with one or more UEs 103, one or more other DUs 1103 (e.g., via RUs 1101 associated with DUs 1103), and/or any other suitable type of device. In the uplink direction, RU 1101 may receive traffic from UE 103 and/or another DU 1103 via the RF interface and may provide the traffic to DU 1103. In the downlink direction, RU 1101 may receive traffic from DU 1103, and may provide the traffic to UE 103 and/or another DU 1103.

RUs 1101 may, in some embodiments, be communicatively coupled to one or more Multi-Access/Mobile Edge Computing ("MEC") devices, referred to sometimes herein simply as ("MECs") 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 103, via a respective RU 1101.

For example, RU 1101-1 may route some traffic, from UE 103, to MEC 1107-1 instead of to a core network (e.g., via DU 1103 and CU 1105). MEC 1107-1 may process the traffic, perform one or more computations based on the received traffic, and may provide traffic to UE 103 via RU 1101-1. In this manner, ultra-low latency services may be provided to UE 103, as traffic does not need to traverse DU 1103, CU 1105, and an intervening backhaul network between DU network 1100 and the core network. In some embodiments, MEC 1107 may include, and/or may implement some or all of the functionality described above with respect to Density Alert System 107.

Figure 12:
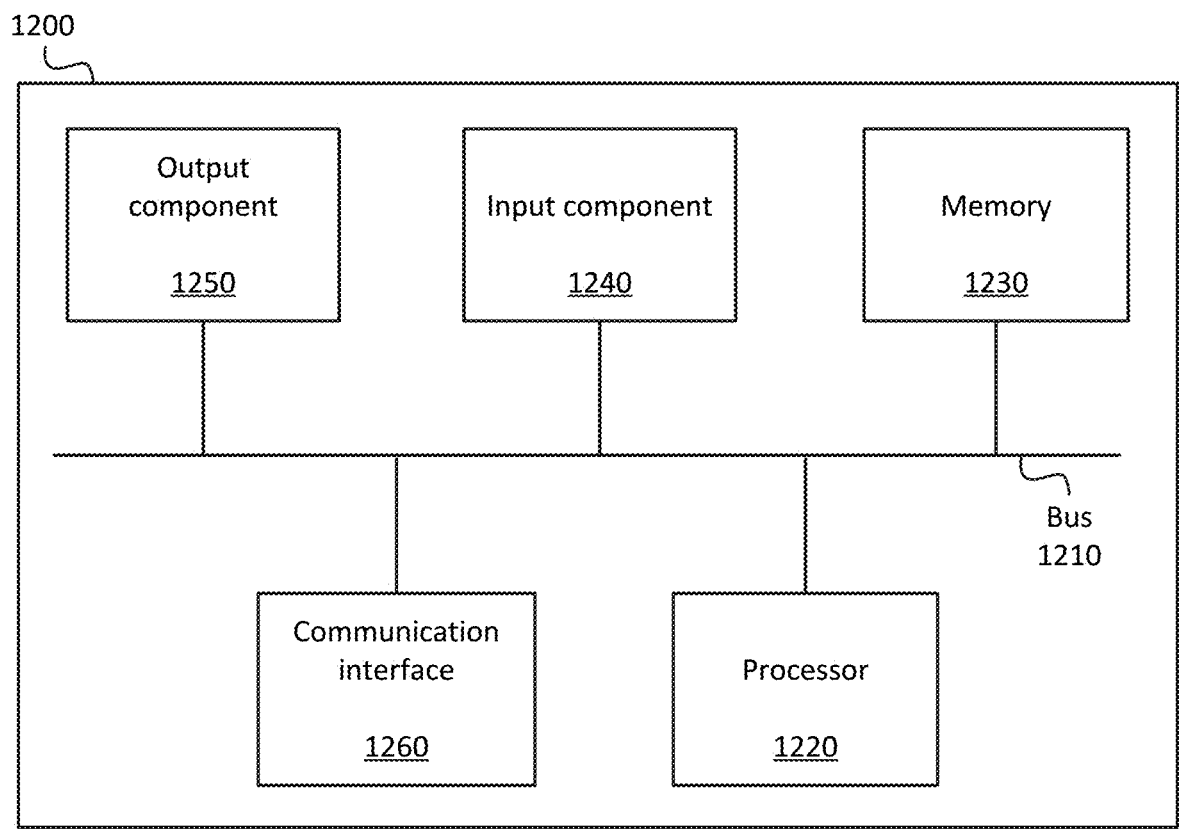
FIG. 12 illustrates example functional components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1, 3, 4, 6, 7A, 7B, 8A, 8C, and 9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive location information associated with one or more User Equipment ("UEs"), wherein the location information for a set of UEs indicates that the set of UEs are located within a particular geographic region;
receive density policy information indicating a threshold population density associated with the particular geographic region;
determine, based on the received location information, a quantity of UEs located within the particular geographic region;
determine a population density associated with the particular geographic region based on the determined quantity of UEs located within the particular geographical region;
compare the determined population density associated with the particular geographical region to the threshold population density associated with the particular geographical region;
determine, based on the comparing, that the population density associated with the particular geographical region exceeds the threshold population density associated with the particular geographical region;
receive a navigation request, wherein the navigation request specifies a articular mode of transportation;
selectively determine, based on the specified particular mode of transportation, a navigation route in response to the navigation request, wherein the selective determining includes:
when the specified particular mode of transportation is a first mode of transportation, determine a first navigation route that includes the particular geographical region, and
when the specified particular mode of transportation is a second mode of transportation, determine a second navigation route that avoids the particular geographical region; and
output the determined first or second navigation route in response to the navigation request.

2. The device of claim 1, wherein the one or more processors are further configured to:
output, based on determining that the population density associated with the particular geographical region exceeds the threshold population density associated with the particular geographical region, an alert to one or more of the set of UEs that are located within the geographical region.

3. The device of claim 1, wherein the one or more processors are further configured to:
determine that a destination specified in the navigation request is within the particular geographical region; and
output an indication that the destination is associated with a population density that exceeds the threshold population density associated with the particular geographical region.

4. The device of claim 1, wherein the one or more processors are further configured to:
monitor location information for a particular UE that is located outside of the particular geographical region;
determine, based on monitoring the location information for the particular UE, that the particular UE is heading towards the particular geographical region; and
output an alert to the particular UE, indicating that the particular geographical region is associated with a population density that exceeds the threshold population density, based on determining that the particular UE is heading towards the particular geographical region.

5. The device of claim 1, wherein the one or more processors are further configured to:
determine, after outputting the determined first or second navigation route, that the population density associated with the particular geographical region has fallen below the threshold population density; and
output an indication that the population density associated with the particular geographical region has fallen below the threshold population density.

6. The device of claim 1, wherein the density policy information associated with the particular geographical region is first density policy information that is different from second density policy information associated with a different geographical region.

7. The device of claim 1, wherein the one or more processors are further configured to:
identify a display device that is associated with the particular geographical region; and
output an alert via the display device based on determining that the population density associated with the particular geographical region exceeds the threshold population density associated with the particular geographical region.

8. A non-transitory computer-readable medium, storing a plurality of processor-executable instructions to:
receive location information associated with one or more User Equipment ("UEs"), wherein the location information for a set of UEs indicates that the set of UEs are located within a particular geographic region;
receive density policy information associated with the particular geographic region, wherein the density policy information indicates a threshold population density associated with the particular geographic region;
determine, based on the received location information, a quantity of UEs located within the particular geographic region;
determine a population density associated with the particular geographic region based on the determined quantity of UEs located within the particular geographical region;
compare the determined population density associated with the particular geographical region to the threshold population density associated with the particular geographical region;
determine, based on the comparing, that the population density associated with the particular geographical region exceeds the threshold population density associated with the particular geographical region;
receive a navigation request, wherein the navigation request specifies a particular mode of transportation;
selectively determine, based on the specified particular mode of transportation, a navigation route in response to the navigation request, wherein the selective determining includes:
when the specified particular mode of transportation is a first mode of transportation, determine a first navigation route that includes the particular geographical region, and
when the specified particular mode of transportation is a second mode of transportation, determine a second navigation route that avoids the particular geographical region; and
output the determined first or second navigation route in response to the navigation request.

9. The non-transitory computer-readable medium of claim 8, wherein the plurality of processor-executable instructions further include processor-executable instructions to:
output, based on determining that the population density associated with the particular geographical region exceeds the threshold population density associated with the particular geographical region, an alert to one or more of the set of UEs that are located within the geographical region.

10. The non-transitory computer-readable medium of claim 8, wherein the plurality of processor-executable instructions further include processor-executable instructions to:
determine that a destination specified in the navigation request is within the particular geographical region; and
output an indication that the destination is associated with a population density that exceeds the threshold population density associated with the particular geographical region.

11. The non-transitory computer-readable medium of claim 8, wherein the plurality of processor-executable instructions further include processor-executable instructions to:
monitor location information for a particular UE that is located outside of the particular geographical region;
determine, based on monitoring the location information for the particular UE, that the particular UE is heading towards the particular geographical region; and
output an alert to the particular UE, indicating that the particular geographical region is associated with a population density that exceeds the threshold population density, based on determining that the particular UE is heading towards the particular geographical region.

12. The non-transitory computer-readable medium of claim 8, wherein the plurality of processor-executable instructions further include processor-executable instructions to:
determine, after outputting the determined first or second navigation route, that the population density associated with the particular geographical region has fallen below the threshold population density; and
output an indication that the population density associated with the particular geographical region has fallen below the threshold population density.

13. The non-transitory computer-readable medium of claim 8, wherein the density policy information associated with the particular geographical region is first density policy information that is different from second density policy information associated with a different geographical region.

14. A method, comprising:
receiving location information associated with one or more User Equipment ("UEs"), indicating that a set of UEs are located within a particular geographic region;
receiving density policy information indicating a threshold population density associated with the particular geographic region;
determining, based on the received location information, a quantity of UEs located within the particular geographic region;
determining a population density associated with the particular geographic region based on the determined quantity of UEs located within the particular geographical region;
comparing the determined population density associated with the particular geographical region to the threshold population density associated with the particular geographical region;
receiving a navigation request, wherein the navigation request specifies a particular mode of transportation;
selectively determining, based on the specified particular mode of transportation, a navigation route in response to the navigation request, wherein the selective determining includes:
when the specified particular mode of transportation is a first mode of transportation, determining a first navigation route that includes the particular geographical region, and
when the specified particular mode of transportation is a second mode of transportation, determining a second navigation route that avoids the particular geographical region; and
outputting the determined first or second navigation route in response to the navigation request.

15. The method of claim 14, further comprising:
outputting, based on determining that the population density associated with the particular geographical region exceeds the threshold population density associated with the particular geographical region, an alert to one or more of the set of UEs that are located within the geographical region.

16. The method of claim 14, further comprising:
determining that a destination specified in the navigation request is within the particular geographical region; and
outputting an indication that the destination is associated with a population density that exceeds the threshold population density associated with the particular geographical region.

17. The method of claim 14, further comprising:
monitoring location information for a particular UE that is located outside of the particular geographical region;
determining, based on monitoring the location information for the particular UE, that the particular UE is heading towards the particular geographical region; and
outputting an alert to the particular UE, indicating that the particular geographical region is associated with a population density that exceeds the threshold population density, based on determining that the particular UE is heading towards the particular geographical region.

18. The method of claim 14, further comprising:
determining, after outputting the determined first or second navigation route, that the population density associated with the particular geographical region has fallen below the threshold population density; and
outputting an indication that the population density associated with the particular geographical region has fallen below the threshold population density.

19. The method of claim 14, wherein the density policy information associated with the particular geographical region is first density policy information that is different from second density policy information associated with a different geographical region.

20. The method of claim 14, further comprising:
identifying a display device that is associated with the particular geographical region; and
outputting an alert via the display device based on determining that the population density associated with the particular geographical region exceeds the threshold population density associated with the particular geographical region.

* * * * *